UNITED STATES PATENT OFFICE.

ALEXANDRE VAN STRAALER, OF POLA DE LENA, ASTURIAS, SPAIN.

PROCESS OF EXTRACTING ARSENIC AND MERCURY CONTAINED IN THE RESIDUES OBTAINED IN THE DISTILLATION OF MERCURIAL ORES.

SPECIFICATION forming part of Letters Patent No. 320,417, dated June 16, 1885.

Application filed March 9, 1885. (No specimens.) Patented in Spain March 22, 1884; in Austria-Hungary December 29, 1884, and in Italy December 31, 1884.

*To all whom it may concern:*

Be it known that I, ALEXANDRE VAN STRAALER, a resident of Pola de Lena, Asturias, Spain, have invented a new and useful improvement in process of extracting arsenic and mercury contained in the residues obtained in the distillation of mercurial ores, which process is fully set forth in the following specification.

The invention has reference to the treatment of the soot or residues which, in the distillation of ores of mercury, are obtained from the chambers, aludels, or condensers. These residues contain sulphides of mercury, metallic mercury in infinitesimal particles, greasy matters, powdered materials of different kinds, oxides, chlorides of mercury, &c. Moreover, if the ore contained arsenic, there would be found in the residues arsenious acid, metallic arsenic, sulphides of arsenic, and also mercurial compounds, sulphates, arseniates, &c. The particles of mercury contained in the mass cannot be extracted by the mechanical methods heretofore employed, because the great quantity of foreign and greasy matters prevents the particles from uniting to form drops, and in any case the mercurial compounds are lost if the ore does not contain arsenic, and if it contain arsenic the mercury amalgamated with the metallic arsenic is lost, as well as the mercurial and arsenical compounds.

Distillation of the soot or residues has also been proposed for separation of the mercury, by heating the residues in iron tubes which are connected with iron condensation-tubes, the condensed mercury running out from the condensation-tubes into a reservoir; but in this old process neither reagents nor pressure in the retort has been employed, so far as I am aware, nor has the process been so conducted as to decompose, or at least thoroughly and effectually to decompose, the mercurial compounds and separate the mercury therefrom.

The recovery of the mercury and arsenic or the mercury (if the ore does not contain arsenic) is the object of the present invention.

The invention also has for its object to separate the mercury from the arsenic which is carried over with it, by a subsequent distillation under such conditions that the arsenic or arsenical compound is melted and can be cast into commercial forms. Of course, the purification from metals is not new, but, so far as I am aware, it has not heretofore been attempted so to separate it from arsenic, and certainly not to effect the separation in such way as to fuse the arsenic compound and obtain it in commercial shape.

I. *Where the soot or residue contains arsenic.*—If, in a close vessel provided with a condenser, sulphides of arsenic and sulphides of mercury be subjected to a certain temperature with a proper degree of pressure the sulphur of the mercury sulphide combines with the arsenic, leaving the mercury free. This action may be explained by the instability of the sulphides of arsenic, and by the fact that those sulphides which are very rich in arsenic distill at a temperature much more elevated than those rich in sulphur. At a certain temperature they decompose and the sulphur combines in large proportion with the arsenic at the commencement of the decomposition, and the sulphide formed goes off to be condensed in the apparatus of condensation. As the temperature rises, less and less sulphur is contained in the sulphides of arsenic in the vessel, and when the temperature is reached at which sulphide of mercury is decomposed the sulphide of arsenic which remains is very poor in sulphur and unites with the sulphur of the sulphide of mercury. The residues or soot, (products of the distillation of mercury, such as collect in the chambers, aludels, or condensers,) either after the mercury has been separated, so far as the separation can be effected by the mechanical means heretofore in use, or previously, are charged into a close vessel or retort provided with a condenser, the outlet from which communicates with a pipe which is immersed at the other end in water to such a depth as to maintain the desired degree of pressure. Before introducing the material to be treated it is mixed with a certain quantity of deoxidating and desulphurating reagent. When the charge has been inserted, the temperature is raised little by little until a red heat is obtained. The rise is made very slow at the beginning in order to prevent powdered material from being carried over by the escaping steam or gas. From the product of this distillation the mercury is separated by mechanical means so far as possible and the remainder is placed in a close vessel, such as before described, after first mixing with the quantity of sulphur necessary for the production of one of the less unstable sulphides, such as the bisulphide, for example. So soon as the whole mass is melted, sulphur is added and the temperature raised so as to produce red orpiment or the sulphide of arsenic corresponding to $AsS_2 + 2AsS_3$, and it is then run into molds or receptacles of any kind.

In the condenser will be found the different arsenical products, but in very small quantities, and also the whole of the mercury. This latter may be separated mechanically and the residue be subjected to a new operation.

Instead of red orpiment, orpiment or any sulphide of arsenic can be manufactured in like manner.

If it be desired to obtain white arsenic or arsenious acid, the residue or soot is distilled in the manner above described, but it is mixed only with lime or a desulphurant; and the result of the first operation is arsenious acid in powder with metallic mercury. This product is melted in an apparatus such as used in Saxony, or in other suitable apparatus, and the result is on the one hand compact and vitreous arsenious acid, and on the other, in the condenser all the metallic mercury mixed with an insignificant quantity of arsenious acid in powder. The mercury is separated mechanically and the residue is added to the material for a following operation.

II. *Where the mercurial soot or residue does not contain arsenic.*—After a preliminary mixing with a desulphurating, reducing, or other suitable reagent, the soot or residue is distilled in a retort-furnace provided with a condenser, as already described, taking care to conduct the operation slowly at the beginning to avoid carrying over any powder, and the temperature is increased gradually until that necessary for the decomposition of the mercurial compound is attained. In the condenser is collected all the metallic mercury with an insignificant quantity of powder. The mercury is separated mechanically and the residue is added to a following operation.

In the place of mixing the reagents with the soot in either case, a second retort for containing the reagents alone can be interposed between the retort and condenser, and the resistance which it opposes to the passage of the gases suffices generally to produce the desired pressure. The immersion of the exit-pipe in water is then unnecessary, and the non-condensible products of distillation may be permitted to escape into the atmosphere.

The second retort has an independent fire, in order that it may be heated and the reagents be brought to the temperature desired for the decomposition of the mercurial and arsenical compounds before lighting the fire under the distilling-retort. In this manner the passage into the condenser of unreduced compounds is avoided, and the consumption is reduced to what is strictly necessary.

I claim—

1. The process herein described for the extraction of mercury and arsenic contained in the residues or soot obtained in distilling their ores by heating said residues or soot gradually in a close vessel under pressure to the temperature required for decomposing the mercurial and the arsenical compounds and condensing the products of distillation, the decomposition of said compounds being assisted by suitable reagents, to the action of which they are subjected, substantially as described.

2. The process of separating arsenic and mercury by heating the mass and thereby melting the arsenical compound and volatilizing and condensing the mercury, substantially as described.

In testimony whereof I have signed this specification in the presence of two subscribing witnesses.

A. VAN STRAALER.

Witnesses:
GENEROSO MARTINEZ,
EUSTOQUID SUAREZ.